United States Patent
Kyo (10) Patent No.: US 6,625,300 B1
(45) Date of Patent: Sep. 23, 2003

(54) CAR SENSING METHOD AND CAR SENSING APPARATUS

(75) Inventor: Sholin Kyo, Tokyo (JP)

(73) Assignee: NEC Corporation (JP)

( * ) Notice: Subject to any disclaimer, the term of this patent is extended or adjusted under 35 U.S.C. 154(b) by 0 days.

(21) Appl. No.: 09/413,438

(22) Filed: Oct. 6, 1999

(30) Foreign Application Priority Data

Oct. 9, 1998 (JP) .............................................. 10-287434

(51) Int. Cl.⁷ ................................................ G06K 9/00

(52) U.S. Cl. ......................... 382/104; 382/291; 340/907

(58) Field of Search ................................. 382/104, 106, 382/190, 199, 291; 701/200, 201, 207, 209, 1, 3, 19, 20, 21, 45, 91, 93, 96, 117; 340/438, 525, 440; 180/907, 172, 197, 282, 283, 290; 246/83, 90, 126, 166

(56) References Cited

U.S. PATENT DOCUMENTS

| | | | | |
|---|---|---|---|---|
| 5,087,969 A | * | 2/1992 | Kamada et al. ............... | 358/103 |
| 5,555,312 A | * | 9/1996 | Shima et al. ................ | 382/104 |
| 5,557,543 A | | 9/1996 | Parsons | |
| 5,687,249 A | * | 11/1997 | Kato ........................... | 382/104 |
| 5,825,284 A | * | 10/1998 | Dunwoody ................... | 340/440 |

FOREIGN PATENT DOCUMENTS

| | | |
|---|---|---|
| DE | 4308776 | 9/1993 |
| DE | 19934925 | 2/2000 |
| JP | 3-83474 | 4/1991 |

OTHER PUBLICATIONS

"Multiple Ojbect Recognition and Scene Interpretation for Autonomous Road Vehicle Guidance" Thomanek, et al., IEEE Symposium on Intelligent Vehicles, Parks, 1994.

* cited by examiner

*Primary Examiner*—Jayanti K. Patel
*Assistant Examiner*—Abolfazl Tabatabai
(74) *Attorney, Agent, or Firm*—Dickstein, Shapiro, Morin & Oshinsky, LLP.

(57) ABSTRACT

Disclosed are a car sensing method and a car sensing apparatus, which are cable of sensing a car surely in spite of an image with poor contrast.

Image inputting means photographs a rear portion of another car running ahead of a car mounting a car sensing apparatus, for example, and generates image data. Edge line segment extraction means extracts horizontal and vertical edge line segments included in an image based on the image data. Line segment pair extracting means extracts a pair of vertical edge line segments among the extracted vertical edge line segments, a horizontal distance and a vertical distance between the vertical edge line segments forming the pair satisfying a reference condition relating to a car width and a car height. Line segment pair evaluation value calculating means selects horizontal edge line segments existing, in the horizontal direction, between the vertical edge line segments among the horizontal edge line segments for each pair of vertical edge line segments. Based on the number, positions and lengths of the selected horizontal line segments, the line segment pair evaluation value calculating means calculates an evaluation value relating to a possibility that the vertical edge line segments forming the pair are line segments expressing both side end portions. Decision means compares the evaluation value with a reference value, and decides whether or not the vertical edge line segments forming the pair are line segments expressing the both side end portion of the car.

15 Claims, 6 Drawing Sheets

CAR SENSING METHOD AND CAR SENSING APPARATUS

BACKGROUND OF THE INVENTION

The present invention relates to a car sensing apparatus incorporated in an automatically running system and a running assistance system, which is capable of avoiding other cars running ahead of a car, and following other cars running ahead of the cars, and a method for sensing the same.

Figure 6:
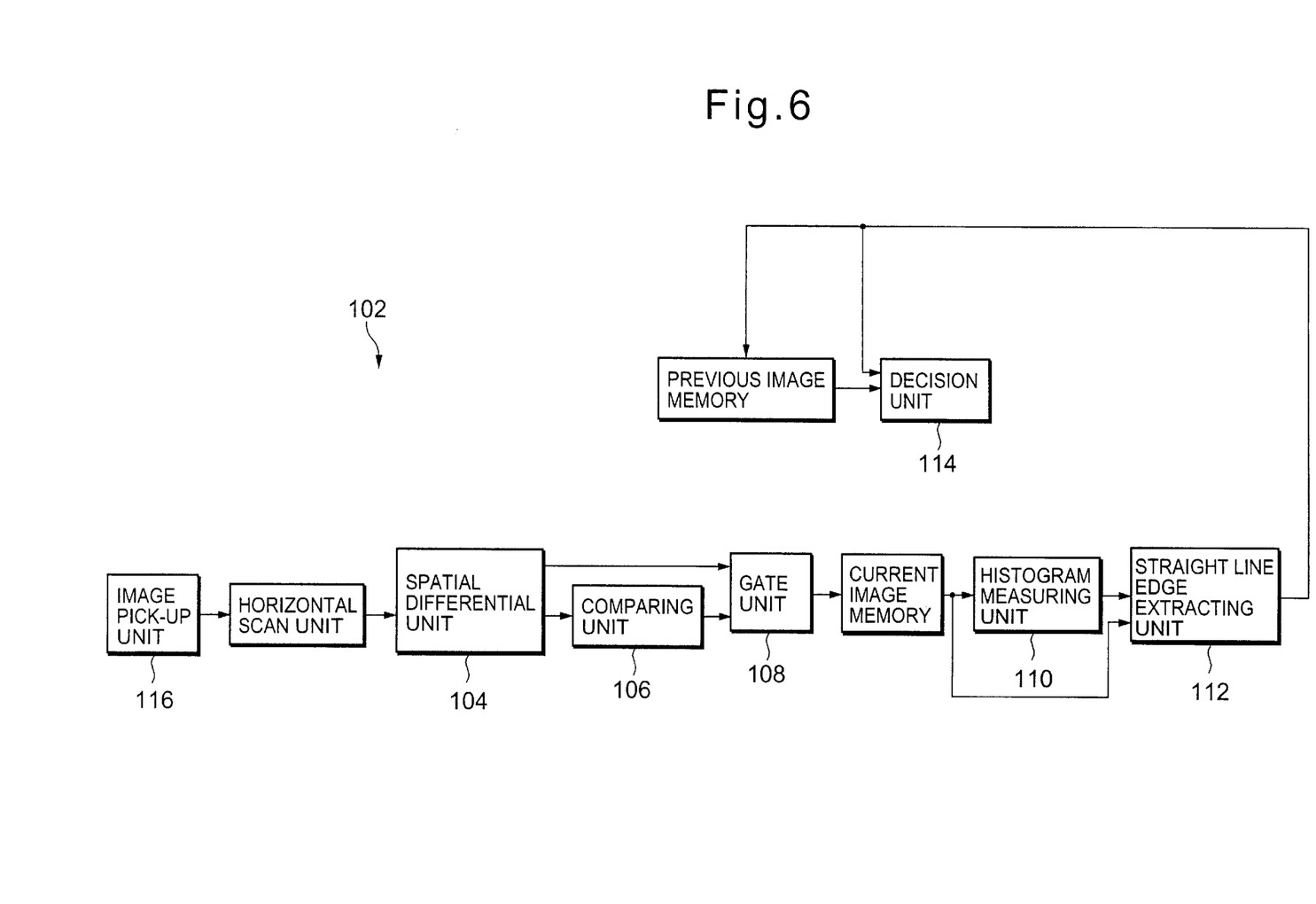
FIG. 6 is a block diagram showing a conventional car sensing apparatus.

An example of a conventional car sensing apparatus is disclosed in Japanese Patent Laid-open No. Heisei 3-83474. As shown in FIG. 6, the conventional car sensing apparatus 102 comprises a spatial differential unit 104; a comparison unit 106; a gate unit 108; a histogram measuring unit 110; a straight line edge extracting unit 112 and a decision unit 114. The conventional car sensing apparatus 102 analyzes a spatial differential value, and when portions which exhibit crowded spatial differential values directing the same direction, e.g., a vertical direction, that is, portions where edges of images in the same direction are crowded on a screen, exist while making a pair with a proper interval therebetween, this car sensing apparatus 102 decides that the car exists.

Specifically, the photographed image by a photography unit 116 is differentiated by the spatial differential unit 104, and an absolute value of the differentiated value is calculated for each pixel. The comparison unit 106 compares the differential absolute value, which was obtained for each pixel, With a set value, and the gate unit 108 selects the differential absolute value larger than the set value among them, thus outputting a differential direction code.

The histogram measuring unit 110 creates a histogram for each differential direction based on the differential direction code. The straight line edge extracting unit 112 extracts the distribution of the pixels With regard to the differential direction code based on the histogram created. The decision unit 118 decides that the car exists in the image photographed by the photograph unit when the distribution of the differential direction code forms two peaks.

As described above, since in the conventional car sensing apparatus 102 of such kind, the existence of the car is decided depending on whether the distribution of the differential direction code forms the two peaks, it is a fundamental requirement that the distribution of the differential direction code can be obtained distinctly. Many clear edges must be contained in the image for the sake of acquiring a clear distribution.

Under conditions that only an input image with poor contrast cannot be obtained, such as bad weather and photographing against the light, since an edge of the image becomes unclear and the number of edges to be extracted is small, the distribution of the differential direction code becomes unclear. Accordingly, it is difficult to discriminate whether two peaks are formed from such histogram or not, so that decision of existence of the car becomes inevitably inaccurate.

SUMMARY OF THE INVENTION

The present invention was invented to solve the above described problems, the object of the present invention is to provide a car sensing apparatus which is capable of accurately sensing a car even when only an image with poor contrast cannot be obtained under conditions such as bad weather and photographing against the light, and a method for sensing a car.

To solve the above described problems, a method for sensing a car comprises: an image inputting step for photographing an object and generating image data of the object; an edge line segment extracting step for extracting horizontal edge line segments and vertical edge line segments which are included in an image by the image data, based on the image data generated in the image inputting step; a line segment pair extracting step for extracting a pair of vertical edge line segments among the vertical edge line segments extracted in the edge segment extracting step, horizontal and vertical distances between the vertical edge line segments forming a pair satisfying reference conditions relating to a car height and a car width; a line segment pair evaluation value calculating step for selecting horizontal edge line segments existing between the vertical edge line segments forming the pair in a horizontal direction, among the horizontal edge line segments extracted in the edge line segment extracting step, for each vertical edge line segment extracted in the line segment pair extracting step, and, based on the number of the selected horizontal edge line segments, positions of the selected horizontal edge line segments and lengths of the selected edge line segments, calculating an evaluation value relating to a possibility that the vertical edge line segments forming the pair may be line segments expressing both side end portions of the car; and a decision step for comparing a reference value with the evaluation value calculated in the line segment pair evaluation value calculating step and deciding whether or not the vertical edge line segments forming the pair are line segments expressing the both side end portions of the car.

A car sensing apparatus of the present invention comprises: image inputting means for photographing an object and generating image data of the object; edge line segment extracting means for extracting horizontal edge line segments and vertical edge line segments which are included in an image by the image data, based on the image data generated by the image inputting means; line segment pair extracting means for extracting a pair of vertical edge line segments among the vertical edge line segments extracted by the edge line segment extracting means, horizontal and vertical distances between the vertical edge line segments forming the pair satisfying reference conditions relating to a car height and a car width; line segment pair evaluation value calculating means for selecting horizontal edge line segments existing between the vertical edge line segments forming the pair in a horizontal direction, among the horizontal edge line segments extracted by the edge line segment extracting means, for each vertical edge line segment pair extracted by the line segment pair extracting means, and, based on the number of the selected horizontal edge line segments, positions of the selected horizontal edge line segments and lengths of the selected edge line segments, calculating an evaluation value relating to a possibility that the vertical edge line segments forming the pair may be line segments expressing both side end portions of the car; and a decision means for comparing a reference value with the evaluation value calculated by the line segment pair evaluation value calculating means and deciding whether or not the vertical edge line segments forming the pair are line segments expressing the both side end portions of the car.

BRIEF DESCRIPTIONS OF THE DRAWINGS

For a more complete understanding of the present invention and the advantages thereof reference is now made to the following description taken in conjunction with the accompanying drawings, in which.

DETAILED DESCRIPTIONS OF THE PREFERRED EMBODIMENTS

Embodiments of the present invention will be described with reference to the drawings.

Figure 1:
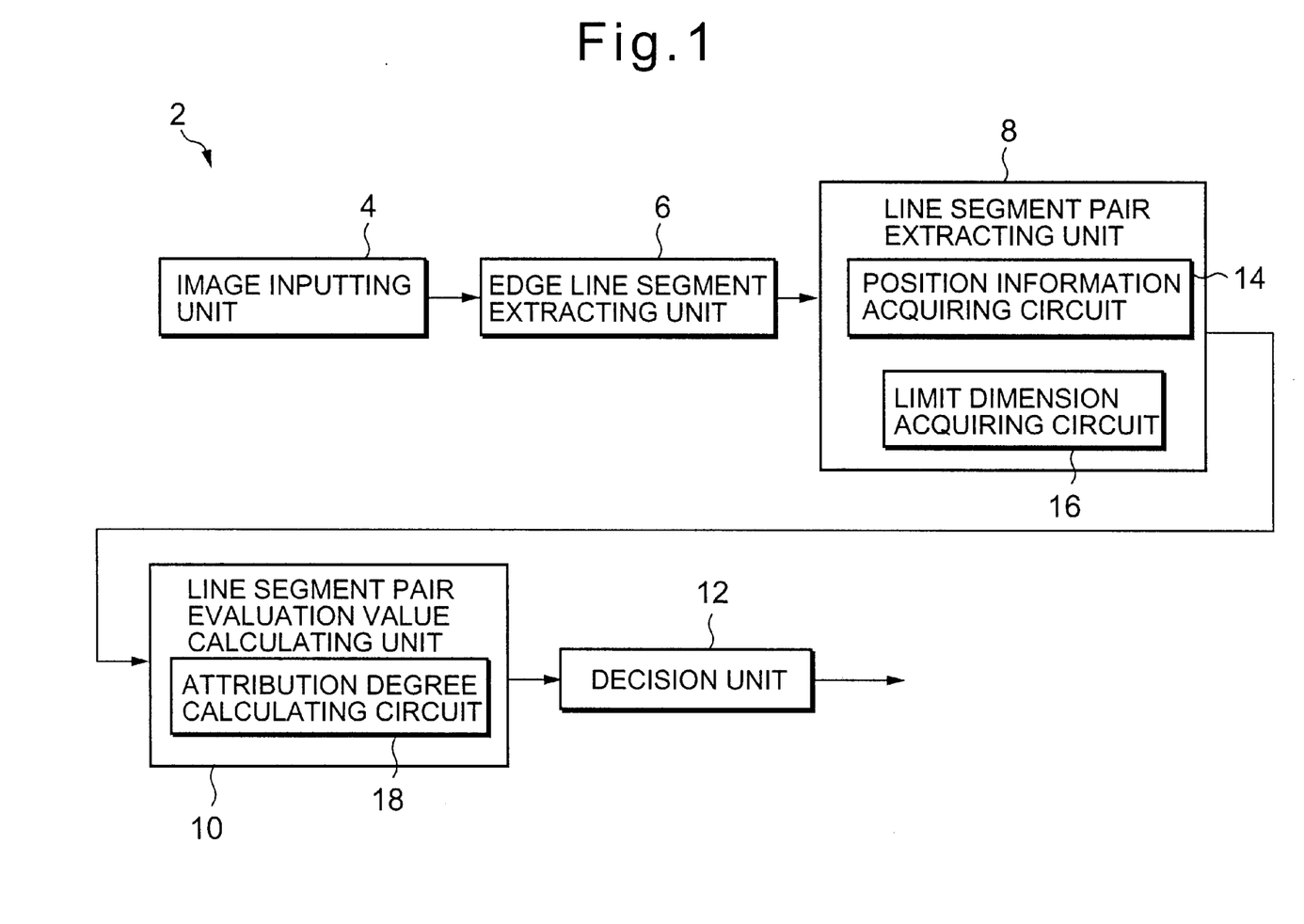
FIG. 1 is a block diagram showing an example of a car sensing apparatus of the present invention.

Referring to FIG. 1, the car sensing apparatus 2, which is installed in a car and senses other cars running ahead of the car, comprises an image inputting unit 4, an edge line segment extracting unit 6, a line segment pair extracting unit 8, a line segment pair evaluation value calculating unit 10 and a decision unit 12.

The image inputting unit 4 includes a video camera equipped with a solid image pick-up device, and photographs an object to generate digital image data. The edge line segment extracting unit 6 extracts horizontal edge line segments and vertical edge line segments included in an image expressed by the image data, based on the image data generated by the image inputting unit 4.

More specifically, the edge line segment extracting unit 6 performs an edge filter processing a binarization processing and a labeling processing, which have been well known in the image processing field, for the image data generated by the image inputting unit 4.

The line segment pair extracting unit 8 extracts pairs of vertical edge line segments among the vertical edge line segments extracted by the edge line segment extracting unit 6. Horizontal and vertical distances between vertical edge line segments constituting the pair of vertical edge line segments satisfy a reference condition relating to a car height and a car width.

More specifically, the line segment extracting unit 8 includes a position information acquiring circuit 14 and a limit dimension acquiring circuit 16 as shown in FIG. 1. The position information acquiring circuit 14 calculates a position of the center of gravity, in the vertical direction, of the two vertical edge line segments forming a pair (hereinafter referred to as a vertical edge line segment pair), a horizontal distance between the vertical edge line segments and a vertical distance between the vertical edge line segments, for each vertical edge line segment pair. On the other hand, the limit dimension acquiring circuit 16 obtains the maximum and minimum values of the car width which the car can actually assume and the maximum value of the car height, based on an image angle at the time when the image inputting unit 4 photographs the object as well as on the position of the center of gravity calculated by the position information acquiring circuit 14.

The line segment pair extracting unit 8 extracts the vertical edge line segment pair under the foregoing reference conditions that the horizontal distance between the vertical edge line segments calculated by the position information acquiring circuit 14 is smaller than the maximum value of the car width obtained by the limit dimension acquiring circuit 16, the horizontal distance between the vertical edge line segments calculated by the position information acquiring circuit 14 is larger than the minimum value of the car width obtained by the limit dimension acquiring circuit 16, and the vertical distance between the vertical edge line segments calculated by the position information acquiring circuit 14 is smaller than the maximum value of the car height obtained by the limit dimension acquiring circuit 16.

The line segment pair evaluation value calculating unit 10 selects the horizontal edge line segments existing between the vertical edge line segments forming the pair in the horizontal direction, among the horizontal edge line segments extracted by the edge line segment extracting unit 6, for each pair of vertical edge line segments extracted by the line segment pair extracting unit 8, and, based on the number of the selected horizontal edge line segments, positions of the selected horizontal edge line segments and lengths of the selected edge line segments, calculates the evaluation value relating to the possibility that the vertical edge line segments forming the pair may be the line segments expressing the both side end portions of the car.

As shown in FIG. 1, the line segment pair evaluation value calculating unit 10 includes attribution degree calculating circuit 18 for calculating attribution degrees of the selected horizontal edge line segments to the vertical edge line segment pair. The attribution degree calculating circuit 18 gives a higher attribution degree to the horizontal edge line segment as the position of the center of gravity of the horizontal edge line segments is closer to the position of the center of gravity of the vertical edge line segment pair and the length of the horizontal edge line segment is larger.

The line segment pair evaluation value calculating unit 10 adds up the attribution degrees calculated by the attribution degree calculating circuit 18 for all of the horizontal edge line segments selected, and the value obtained by the addition is used as the evaluation value.

The decision unit 12 compares the reference value with the evaluation value calculated by the line segment pair evaluation value calculating unit 10 and decides whether or not the vertical edge line segments forming the pair are the line segments expressing the both side end portions of the car.

It should be noted that the edge line segment extracting unit 6, the line segment pair extracting unit 8, the line segment pair evaluation value calculating unit 10 and the decision unit 12 can be constituted by, for example, a small sized computer which is equipped with a CPU, a memory and an interface circuit. A predetermined program is loaded on this computer.

Figure 2:
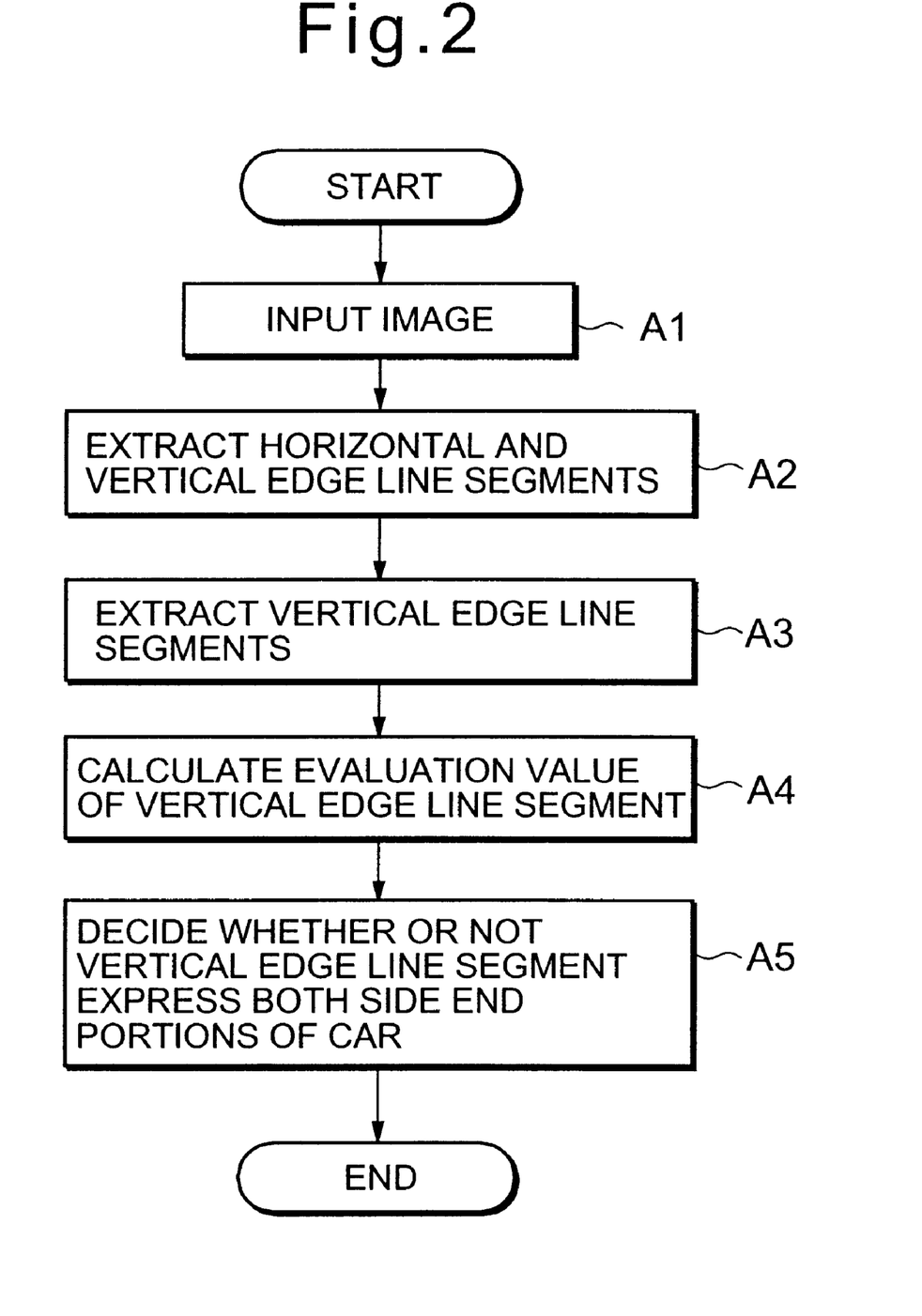
FIG. 2 is a flowchart showing a principal operation of the car sensing apparatus shown in FIG. 1.

Next, an operation of the car sensing apparatus 2 constituted as described above will be first described with reference to the flowchart of FIG. 2.

In the case where the car sensing apparatus 2 is mounted on the car, the image inputting unit 4 photographs a certain area in front of the car in which the car sensing apparatus 2 itself is mounted, and generates data of the photographed image (step A1). When another car runs ahead of the car mounting the car sensing apparatus 2, the image photographed by the image inputting unit 4 contains an image obtained by viewing another car from its back.

The edge line segment extracting unit 6 extracts the horizontal and vertical edge line segments which are included in the image expressed by the image data, based on the image data generated by the image inputting unit 4 (step A2). The horizontal and vertical edge line segments extracted by the edge line segment extracting unit 6 includes external shape lines of the car running ahead of the car sensing apparatus 2, the whole of border lines at portions of the car and the part of the border lines.

The line segment pair extracting unit 8 extracts the pairs of the vertical edge line segments among the vertical edge line segments extracted by the edge line segment extracting unit 6 (step A3). The horizontal and vertical distances between the vertical edge line segment which are extracted and form the pair satisfies the reference condition concerning the car width and the car height.

Thereafter, the line segment pair evaluation value calculating unit 10 selects the horizontal edge line segments existing between the vertical edge line segments forming the pair in the horizontal direction, among the horizontal edge line segments extracted by the edge line segment extracting unit 6, for each pair of vertical edge line segments extracted by the line segment pair extracting unit 8, and, based on the number of the selected horizontal edge line segments, positions of the selected horizontal edge line segments and lengths of the selected edge line segments, calculates the evaluation value relating to the possibility that the vertical edge line segments forming the pair may be the line segments expressing the both side end portions of the car (step A4).

The decision unit 12 decides compares the reference value with the evaluation value calculated by the evaluation value calculating unit 10, and decides that the vertical edge line segments forming the pair are the line segments expressing the both side end portions of the car, only when the evaluation value exceeds the reference value (step A5). Accordingly, when the decision unit 12 decided that the vertical edge line segments forming the pair are the line segments expressing the both side end portions of the car as described above, it is recognized that another car exists in front of the car mounting the car sensing apparatus 2.

Figure 3:
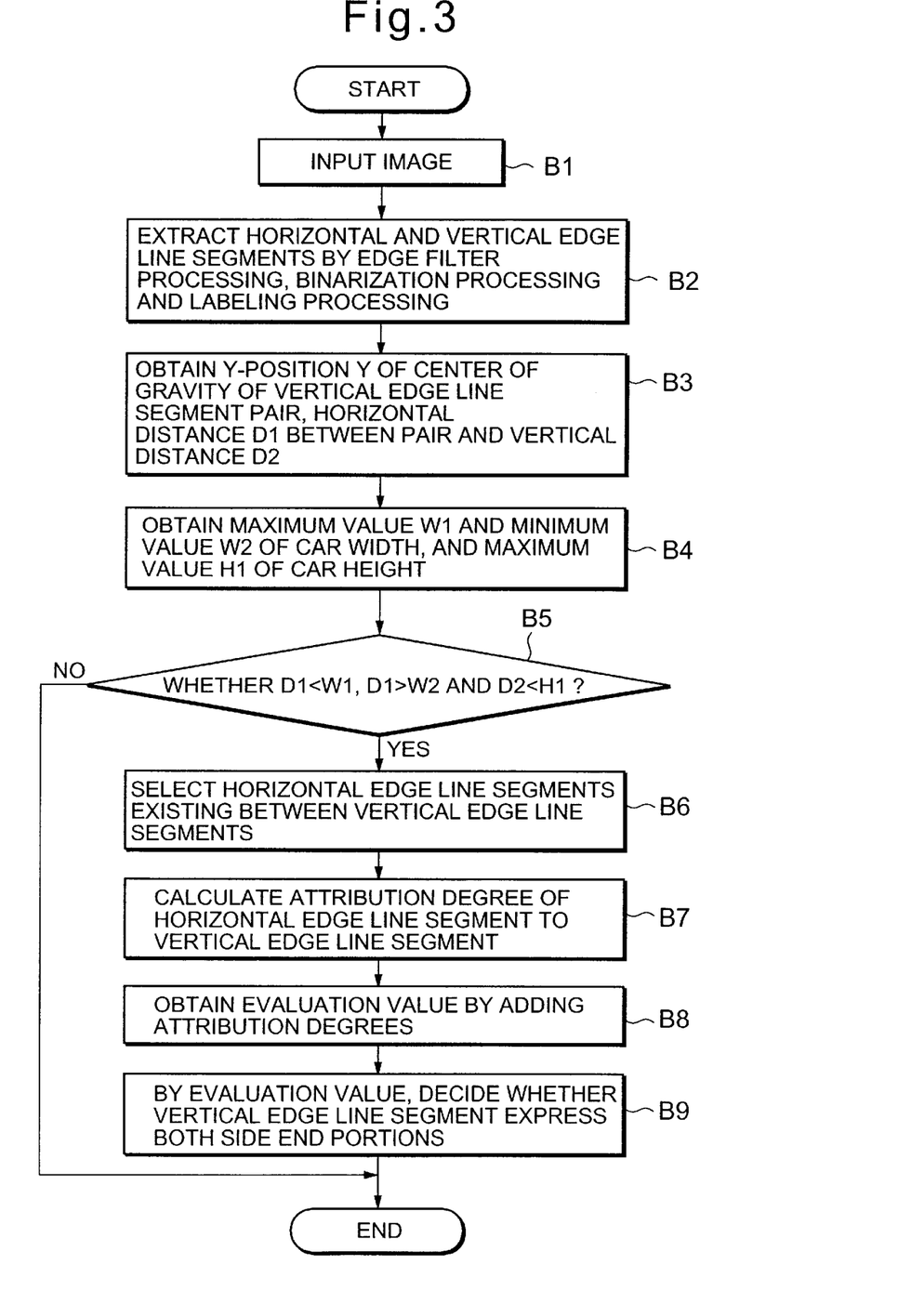
FIG. 3 is a flowchart concretely showing an operation of the car sensing apparatus shown in FIG. 1.

Next, an operation of the car sensing apparatus 2 will be described more specifically with reference to the flowchart of FIG. 3.

As described above, the image inputting unit 4 photographs a certain area in front of the car mounting the car sensing apparatus 2, and generates the data of the photographed image (step B1). The edge line segment extracting unit 6 performs an edge filter processing, a binarization processing and a labeling processing, which have been well known in the image processing filed, for the image data generated by the image inputting unit 4, thus extracting the horizontal and vertical edge line segments (step B2).

The line segment pair extracting unit 8 extracts the vertical edge line segment pairs satisfying the above described reference condition. In order to extract the vertical edge line segment pairs, the position information acquiring circuit 14 constituting the line segment pair extracting unit 8 calculates a position of the center of gravity, in the vertical direction, of the vertical edge line segments forming the pair, a horizontal distance between the vertical edge line segments, and a vertical distance therebetween for all pairs of the vertical edge line segments, for example, the position Y of the center of gravity of the vertical line segment 20 and 23 in the vertical direction, which form the pair, the horizontal distance D1 between the vertical edge line segments 20 and 22 and the vertical distance D2 between the vertical edge line segments 20 and 22, as shown in FIG. 4 (step B3).

Figure 4:
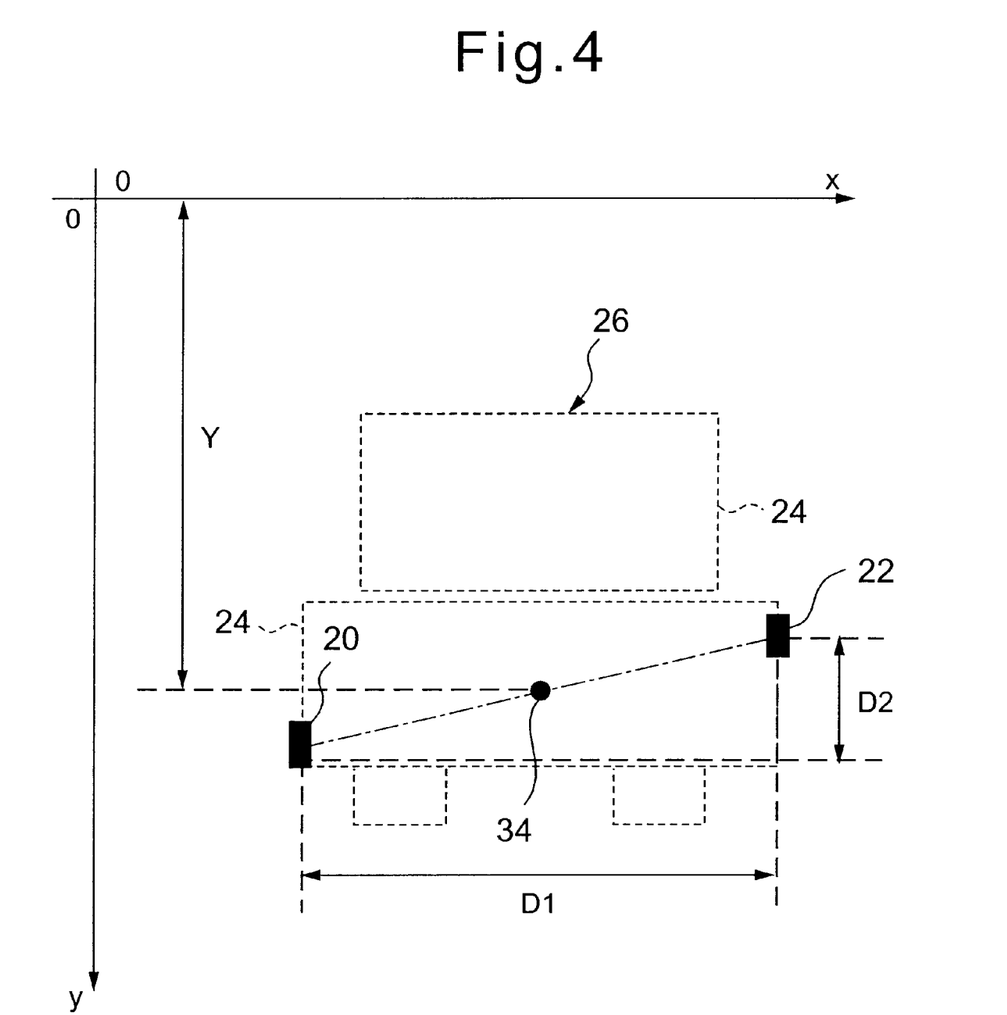
FIG. 4 is an explanatory view for explaining a function of the line segment pair extracting means, which shows a positional relationship between vertical edge line segments constituting a pair.

In FIG. 4, a y-axis is set downward in the vertical direction, and an x-axis is set in the horizontal direction. The dotted line 24 shows an outline of the external shape of the car 26 running ahead when the car 24 is viewed from the back of the car 26. In the example of FIG. 4, the vertical edge line segments 20 and 22 are the line segments which are formed corresponding to the parts of the both side end portions of the car 26. The vertical edge line segments 20 and 22 are the line segments which extend along all of the both end side portions of the car 26 when an image with sufficient contrast is obtained. When an image with poor contrast is obtained, the vertical edge line segments are formed only at a portion of the both side end portions of the car a shown in FIG. 4.

On the other hand, the limit dimension acquiring circuit 16 obtains the maximum and minimum values W1 and W2 of the width of the car which the car can actually assume and the maximum value of the height H1 thereof based on an image angle G at the time when the image inputting means 4 photographs the object as well as on the position Y of the center of gravity calculated by the position information acquiring means 14 (step B4).

Here, when it is assumed that the position Y of the center of gravity corresponds to a height of either a number plate or a trunk of the car 26 and when it is assumed that the car 26 exists in front of the car mounting the car sensing apparatus 2 and its number plate or its trunk is at the position Y, the limit dimension acquiring circuit 16 obtains from such position Y and the image angle G the maximum and minimum values W1 and W2 of the width of the car 26 which the car can 26 actually assume and the maximum value H which the height of the car can actually assume.

To be more specific, the limit dimension acquiring circuit 16 comprises a table in which the position Y of the center of gravity and the image angle G are made to correspond to the maximum and minimum values W1 and W2 of the car width and the maximum value H1 of the car height, and the maximum and minimum values W1 and W2 of the car width and the maximum value H1 of the car height can be obtained by referring to the table.

If the horizontal distance D1 between the line segments calculated by the position information acquiring circuit 14 is smaller than the maximum width W1 of the car width obtained by the limit dimension acquiring circuit 16, the horizontal distance D1 between the line segments calculated by the position information acquiring circuit 14 is larger than the maximum value W2 of the car width obtained by the limit dimension acquiring circuit 16, and the vertical distance D2 between the line segments calculated by the position information acquiring circuit 14 is smaller than the maximum value H1 of the car height obtained by the limit dimension acquiring circuit 16, the line segment extracting unit 8 extracts the vertical edge line segment pair (for example, the vertical edge line segment 20 and 22) as candidates of the vertical edge line segments concerning the both side end portions of the car 26 (Yes in step B5).

Next, the line segment evaluation value calculating unit 10 selects the horizontal edge line segments existing between the vertical edge line segments forming the pair in the horizontal direction, among the horizontal edge line segments extracted by the edge line segment extracting unit 6, for each pair of vertical edge line segments extracted by the line segment pair extracting unit 8 (step B6), and, based on the number of the selected horizontal edge line segments, positions of the selected horizontal edge line segments and lengths of the selected edge line segments, the line segment evaluation value calculating unit 10 calculates the evaluation value relating to the possibility that the vertical edge line segments forming the pair may be the line segments expressing the both side end portions of the car.

To be more specific, the attribution degree calculating circuit 18 constituting the line segment pair evaluation value calculating unit 10 calculates the attribution degrees of the selected horizontal edge line segments to the vertical edge line segment pair (step B7). At the time of calculating the attribution degrees, the attribution degree calculating circuit 18 gives a higher attribution degree to the horizontal edge line segment as the position of the center of gravity of the horizontal edge line segments is closer to the position of the center of gravity of the vertical edge line segment pair and the length of the horizontal edge line segment is larger.

Figure 5:
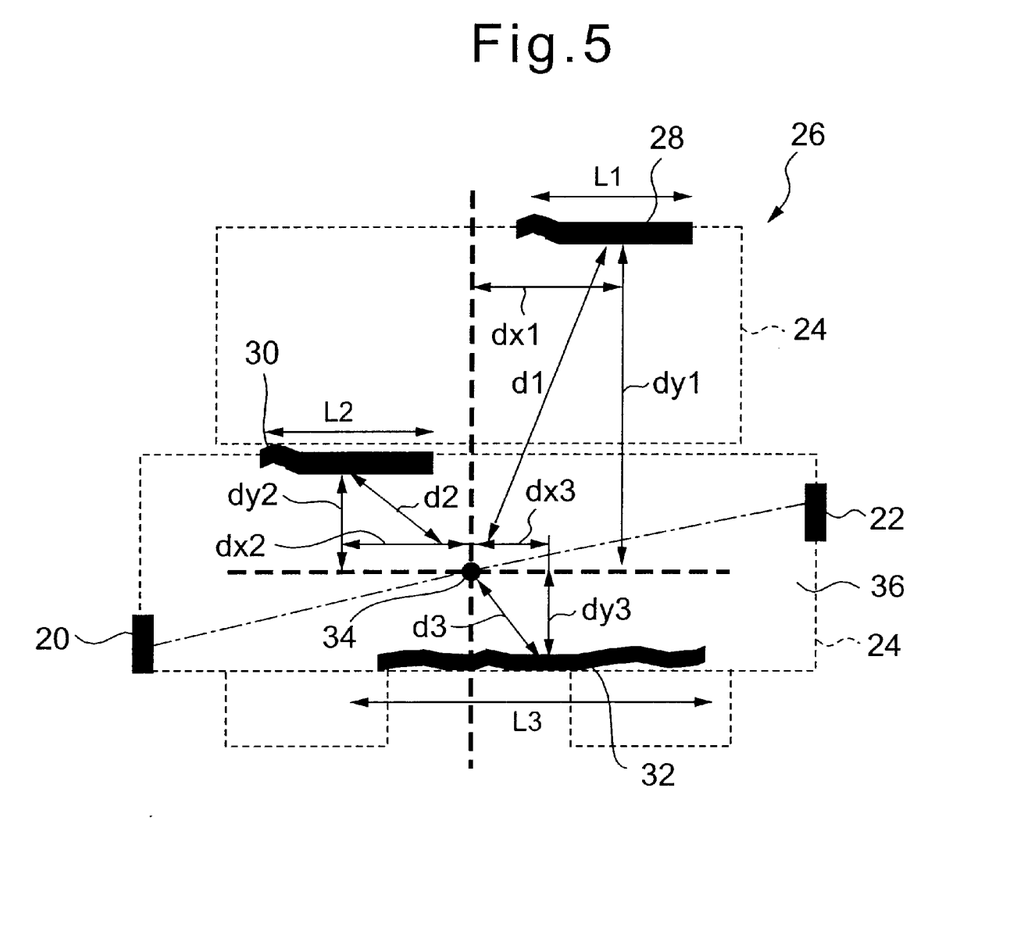
FIG. 5 is an explanatory view showing a calculation of an evaluation value by the line segment pair evaluation value calculating means.

Therefore, in the example shown in FIG. 5, the attribution degree calculating circuit 18 obtains the positions of the centers of gravity of the thee horizontal edge line segments 28 existing between the vertical edge line segments 20 and 22 which form a pair, and calculates the distances d1, d2 and d3 from the centers of gravity of the horizontal edge line segments 28, 30 and 32 to the position 34 of the center of gravity of the vertical edge line segments 20 and 22, respectively.

In FIG. 5, the same components as those in FIG. 4 are denoted by the same reference numerals and symbols. If the horizontal edge line segments 28, 30 and 32 are components concerning the car, the horizontal edge line segments 28, 30 and 32 are formed by an upper end and a lower end of the car, an upper end of the trunk 36, an external shape and a border line. When an image with sufficient contrast is obtained, the horizontal edge line segments 28, 30 and 32 extend inherently all over the width direction of the car. When an image with poor contrast is obtained, the horizontal edge line segments 28, 30 and 32 are only a part of the width of the car as shown in FIG. 5.

The attribution degree calculation circuit 18 calculates the lengths L1, L2 and L3 of the horizontal edge line segments 28, 30 and 32, and calculates the attribution degrees for the horizontal edge line segments 28, 30 and 32 using a and b as a coefficient by the formula (1) in this embodiment.

$$\text{Attribution Degree} = \text{Length of Horizontal Edge Line Segment} \times a - \text{Distance of Center of Gravity} \times b \quad (1)$$

$$\text{Attribution Degree} = \text{Length of Horizontal Edge Line Segment} \times A + B/\text{Distance between Centers of Gravity in Vertical Direction} - C \times \text{Distance of Centers of Gravity in Horizontal Direction} \quad (2)$$

Thereafter, the line segment pair evaluation value calculating unit 10 adds up the attribution degrees calculated by the attribution degree calculating circuit 18 for all of the horizontal edge line segments selected, and the value obtained by the addition is used as the evaluation value (step B8).

In the example of FIG. 5, when the attribution degrees are calculated by the formula (1), the evaluation value is expressed by the formula (3).

$$\text{Evaluation Value} = (L1+L2+L3) \times a - (d1+d2+d3) \times b \quad (3)$$

Furthermore, when the attribution degrees are calculated by the formula (2), the evaluation value is expressed by the formula (4).

$$\text{Evaluation Value} = (L1+L2+L3) \times A + B/(dy1+dy2+dy3) - (dx1+dx2+dx3) \times C \quad (4)$$

It should be noted that $d1 \times d1 = (dx1 \times dx1) + (dy1 \times dy1)$, $d2 \times d2 = (dx2 \times dx2) + (dy2 \times dy2)$ and $d3 \times d3 = (dx3 \times dx3) + (dy3 \times dy3)$.

Then, the decision unit 12 compares the predetermined reference value with the evaluation value calculated by the evaluation value calculating unit 10, and when the evaluation value exceeds the reference value, the decision unit 12 decides that the vertical edge line segments forming the pair (the vertical edge line segments 20 and 22 in the example of FIG. 5) are the line segments expressing the both side end portions of the car.

In the embodiment of the present invention, the car sensing apparatus does not detect the portion where the vertical edge line segments concentrate to decide the existence of the car like the conventional car sensing apparatus, but decides whether or not the vertical edge line segments forming the pair are the line segments relating to the both side end portions of the car, based on the position relationship between the vertical edge line segments and the position relationship between the vertical edge line segments forming the pair and the horizontal edge line segment. Accordingly, even when only a part of the edge line segment cannot be obtained due to a poor contrast of the image or even when many edge line segments cannot be obtained, it is possible to sense the end portion of the car and it is possible to decide the existence of the car precisely.

As described above, in the car sensing method of the present invention, in the image inputting step, the image data of the object is generated by photographing the object, and, in the edge line segment extracting step, the horizontal edge line segments and the vertical edge line segments included in the image by the image data are extracted based on the image data generated in the image inputting step. Then, in the line segment pair extracting step, the pair of vertical edge line segments is extracted among the vertical edge line segments extracted in the edge segment extracting step, a horizontal distance and a vertical distance between the vertical edge line segments forming the pair satisfying the reference conditions relating to the car height and the car width.

Thereafter, in the line segment pair evaluation value calculating step, the horizontal edge line segments existing between the vertical edge line segments forming the pair in the horizontal direction are selected among the horizontal edge line segments extracted in the edge line segment extracting step, for each vertical edge line segment extracted in the line segment pair extracting step, and, based on the number of the selected horizontal edge line segments, the positions of the selected horizontal edge line segments and the lengths of the selected edge line segments, and the evaluation value relating to the possibility that the vertical edge line segments forming the pair may be the line segments expressing the both side end portions of the car is calculated.

In the decision step, the reference value is compared with the evaluation value calculated in the line segment pair evaluation value calculating step, and it is decided whether or not the vertical edge line segments forming the pair are the line segments expressing the both side end portions of the car.

In the car sensing apparatus of the present invention, the image inputting unit photographs the object and generates image data of the object, and the edge line segment extracting unit extracts the horizontal edge line segments and the vertical edge line segments which are included in the image by the image data, based on the image data generated by the image inputting unit. Then, the line segment pair extracting unit extracts the pair of vertical edge line segments among the vertical edge line segments extracted by the edge line segment extracting unit, a horizontal distance and a vertical distance between the vertical edge line segments forming the pair satisfying the reference conditions relating to the car height and the car width.

Thereafter, the line segment pair evaluation value calculating unit selects the horizontal edge line segments existing between the vertical edge line segments forming the pair in the horizontal direction, among the horizontal edge line segments extracted by the edge line segment extracting unit, for each pair of vertical edge line segments extracted by the line segment pair extracting unit, and, based on the number of the selected horizontal edge line segments, the positions of the selected horizontal edge line segments and the lengths of the selected edge line segments, calculates the evaluation value relating to the possibility that the vertical edge line segments forming the pair may be the line segments expressing the both side end portions of the car, and the decision unit compares the reference value with the evaluation value calculated by the line segment pair evaluation value calculating unit and decides whether or not the vertical edge line segments forming the pair are the line segment expressing the both side end portions of the car.

In the present invention, the car sensing apparatus does not detect the portion where the vertical edge line segments concentrate to decide the existence of the car like the conventional car sensing apparatus, but decides whether or not the vertical edge line segments forming the pair are the line segments relating to the both side end portions of the car, based on the position relationship between the vertical edge line segments and the position relationship between the vertical edge line segments forming the pair and the horizontal edge line segment. Accordingly, even when only a part of the edge line segment cannot be obtained due to a poor contrast of the image or even when many edge line segments cannot be obtained, it is possible to sense the end portion of the car and it is possible to decide the existence of the car precisely.

Although the preferred embodiment of the present invention has been described in detail, it should be understood that various changes, substitutions and alternations can be made therein without departing from spirit and scope of the invention as defined by the appended claims.

What is claimed is:

1. A method for sensing a car, comprising
capturing an image of an object and generating image data of the object;
extracting horizontal edge line segments and vertical edge line segments based on said image data generated in said image inputting step;
extracting a pair of vertical edge line segments among said vertical edge line segments extracted in said edge line segment extracting step, said pair of vertical edge line segments having horizontal and vertical distances between the vertical edge line segments forming the pair which satisfy reference conditions relating to a car height and a car width;
selecting horizontal edge line segments existing between said pair of vertical edge line segments in a horizontal direction among said horizontal edge line segments extracted in said edge line segment extracting step for each vertical edge line segment extracted in said line segment pair extracting step, and based on the number of selected horizontal edge line segments, positions of the selected horizontal edge line segments and lengths of the selected edge line segments, calculating an evaluation value relating to a possibility that said pair of vertical edge line segments may be line segments expressing both side end portions of the car; and comparing a reference value with the evaluation value calculated, in said line segment pair evaluation value calculating step and deciding whether or not said pair of vertical edge line segments are line segments expressing the both side end portions of the car.

2. The car sensing method according to claim 1, wherein said edge line segment extracting step extracts said edge horizontal edge segments and said vertical edge segments by performing an edge filter processing, a binarization processing and a labeling processing for said image data generated in said image inputting step.

3. The car sensing method according to claim 1, wherein said line segment pair extracting step further includes:
calculating, for each pair of vertical edge line segments, a position of a center of gravity in a vertical direction of said pair of vertical edge line segments, a horizontal distance between said pair of vertical edge line segments, and a vertical distance between said pair of vertical edge line segments;
obtaining the maximum and minimum values of a width of a car which the car can actually assume and the maximum value of a height thereof, based on an image angle at the time when in said image inputting step the object is photographed, as well as on said position of the center of gravity calculated in said position information acquiring step, and
wherein said vertical edge line segment pair is extracted under reference conditions, said conditions including that the horizontal distance between said vertical edge line segments calculated in said position information acquiring step is smaller than the maximum value of said car width obtained in said limit dimension acquiring step, the horizontal distance between said vertical edge line segments calculated in said position information acquiring step is larger than the minimum value of the car width obtained in said limit dimension acquiring step, and the vertical distance between said vertical edge line segments calculated in said position information acquiring step is smaller than the maximum value of the car height obtained in said limit dimension acquiring step.

4. The car sensing method according to claim 1, wherein the line segment pair evaluation value calculating step includes calculating attribution degrees of said selected horizontal edge line segments to said vertical edge line segment pair, and, in the attribution degree calculating step, wherein as the position of the center of gravity of said horizontal edge line segments gets closer to the position of the center of gravity of said vertical edge line segment pair, and the length of said horizontal edge line segment gets larger, a higher attribution degree is given to said horizontal edge line segment, and wherein in the line segment pair evaluation value calculating step, the attribution degrees calculated in said attribution degree calculating step are added up for all of said horizontal edge line segments selected, and the value obtained by the addition is used as said evaluation value.

5. The car sensing method according to claim 1, wherein in said image inputting step, said car is photographed from the rear of said car.

6. A car sensing apparatus comprising:
image inputting means for capturing an image of an object and generating image data of the object;
edge line segment extracting means for extracting horizontal edge line segments and vertical edge line segments which are included in an image by said image data, based on said image data generated by said image inputting means;

line segment pair extracting means for extracting a pair of vertical edge line segments among said vertical edge line segments extracted by said edge line segment extractor, a horizontal distance and a vertical distance between the vertical edge line segments forming the pair satisfying reference conditions relating to a car height and a car width;

line segment pair evaluation value calculating means for selecting horizontal edge line segments existing between said vertical edge line segment pair in a horizontal direction, among said horizontal edge line segments extracted by said edge line segment extracting means, for each pair of vertical edge line segments extracted by said line segment pair extracting means, and, based on the number of the selected horizontal edge line segments, positions of the horizontal edge line segments and lengths of the horizontal edge line segments, calculating an evaluation value relating to a possibility that said pair of vertical edge line segments may be line segments expressing both side end portions of the car; and decision means for comparing a reference value with said evaluation value calculated by said line segment pair evaluation value calculating means and deciding whether or not the vertical edge line segments forming the pair are line segments expressing the both side end portions of said car.

7. The car sensing apparatus according to claim 6, wherein said edge line segment extracting means performs an edge filter processing, a binarization processing and a labeling processing for said image data generated by said image inputting means, thus extracting said horizontal and vertical edge line segments.

8. The car sensing apparatus according to claim 6,
wherein said line segment pair extracting means includes:
position information acquiring means for calculating a position of the center of gravity, in the vertical direction, of the two vertical edge line segments forming said pair, a horizontal distance between the vertical edge line segments and a vertical distance between the vertical edge line segments, for each pair of vertical edge line segments; and limit dimension acquiring means for obtaining the maximum and minimum values of a width of a car which the car can actually assume, and the maximum value of a height thereof, based on an image angle at the time when said image inputting means photographs the object as well as on the position of the center of gravity calculated by said position information acquiring means, and wherein said line segment pair extracting means extracts said vertical edge line segment pair under said reference conditions that the horizontal distance between said vertical edge line segments calculated by said position information acquiring means is smaller than the maximum value of said car width obtained by said limit dimension acquiring means, the horizontal distance between said vertical edge line segments calculated by said position information acquiring means is larger than the minimum value of said car width obtained by said limit dimension acquiring means, and the vertical distance between said vertical edge line segments calculated by said position information acquiring means is smaller than the maximum value of said car height obtained by said limit dimension acquiring means.

9. The car sensing apparatus according to claim 6,
wherein said line segment pair evaluation value calculating means includes attribution degree calculating means for calculating attribution degrees of said selected horizontal edge line segments to said vertical edge line segment pair, said attribution degree calculating means gives a higher attribution degree to the horizontal edge line segment as the position of the center of gravity of said horizontal edge line segments is closer to the position of the center of gravity of said vertical edge line segment pair and the length of said horizontal edge line segment is larger, and said line segment pair evaluation value calculating means adds up the attribution degrees calculated by said attribution degree calculating means for all of said horizontal edge line segments selected, and the value obtained by the addition is used as said evaluation value.

10. The car sensing apparatus according to claim 6, wherein said image inputting means photographs said car from the rear thereof.

11. A car sensing apparatus comprising:
an image inputting device that captures an image of an object and generates image data of the object;
an edge line segment extractor that extracts horizontal edge line segments and vertical edge line segments which are included in an image by said image data, based on said image data generated by said image inputting device;
a line segment pair extractor that extracts a pair of vertical edge line segments among said vertical edge line segments extracted by said edge line segment extractor, a horizontal distance and a vertical distance between the vertical edge line segments forming the pair satisfying reference conditions relating to a car height and a car width;
a line segment pair evaluation value calculator that calculates horizontal edge line segments existing between said vertical edge line segment pair in a horizontal direction, among said horizontal edge line segments extracted by said edge line segment extractor, for each pair of vertical edge line segments extracted by said line segment pair extractor, and, based on the number of the selected horizontal edge line segments, positions of the horizontal edge line segments and lengths of the horizontal edge line segments, calculating an evaluation value relating to a possibility that said pair of vertical edge line segments may be line segments expressing both side end portions of the car; and
decision means for comparing a reference value with said evaluation value calculated by said line segment pair evaluation value calculator and deciding whether or not the vertical edge line segments forming the pair are line segments expressing the both side end portions of said car.

12. The car sensing apparatus according to claim 11, wherein said edge line segment extractor performs an edge filter processing, a binarization processing and a labeling processing for said image data generated by said image inputting device, thus extracting said horizontal and vertical edge line segments.

13. The car sensing apparatus according to claim 11,
wherein said line segment pair extractor includes:
a position information calculator that calculates a position of the center of gravity, in the vertical direction, of the two vertical edge line segments forming said pair, a horizontal distance between the vertical edge line segments and a vertical distance between the vertical edge line segments, for each pair of vertical edge line segments; and a limit dimension calculator that obtains the maximum and minimum values of a width of a car which the car can actually assume, and the maximum value of a height thereof based on an image angle at the time when said image inputting means photographs the object as well as on the position of the center of gravity calculated by said position information calculator, and wherein said line segment pair extractor extracts said vertical edge line segment pair under said reference conditions, said reference conditions including that the horizontal distance between said vertical edge line segments calculated by said position information calculator is smaller than the maximum value of said car width obtained by said limit dimension calculator, the horizontal distance between said vertical edge line segments calculated by said position information calculator is larger than the minimum value of said car width obtained by said limit dimension calculator, and the vertical distance between said vertical edge line segments calculated by said position information calculator is smaller than the maximum value of said car height obtained by said limit dimension calculator.

14. (The car sensing apparatus according to claim 11, wherein said line segment pair evaluation value calculator includes an attribution degree calculator that calculates attribution degrees of said selected horizontal edge line segments to said vertical edge line segment pair, said attribution degree calculator giving a higher attribution degree to the horizontal edge line segment as the position of the center of gravity of said horizontal edge line segments gets closer to the position of the center of gravity of said vertical edge line segment pair and the length of said horizontal edge line segment gets larger, and said line segment pair evaluation value calculator adding up the attribution degrees calculated by said attribution degree calculator for all of said horizontal edge line segments selected, and the value obtained by the addition is used as said evaluation value.

15. The car sensing apparatus according to claim 11, wherein said image device photographs said car from the rear thereof.

\* \* \* \* \*